(12) United States Patent
Amante et al.

(10) Patent No.: US 11,976,496 B2
(45) Date of Patent: May 7, 2024

(54) TWO POSITION DOOR HANDLE WITH PUSH-PUSH MECHANISM

(71) Applicant: Bell Textron Inc., Fort Worth, TX (US)

(72) Inventors: William Anthony Amante, Grapevine, TX (US); Arunkumar Koppa Siddalingappa, Bangalore (IN)

(73) Assignee: Textron Innovations Inc., Providence, RI (US)

( * ) Notice: Subject to any disclaimer, the term of this patent is extended or adjusted under 35 U.S.C. 154(b) by 942 days.

(21) Appl. No.: 16/915,268

(22) Filed: Jun. 29, 2020

(65) Prior Publication Data
US 2021/0363781 A1 Nov. 25, 2021

(30) Foreign Application Priority Data
May 21, 2020 (IN) .............................. 202021021433

(51) Int. Cl.
*E05B 1/00* (2006.01)
*B64C 1/14* (2006.01)
*E05B 5/00* (2006.01)
*E05B 5/02* (2006.01)
*B64C 29/00* (2006.01)

(52) U.S. Cl.
CPC ............ *E05B 5/003* (2013.01); *B64C 1/1461* (2013.01); *E05B 5/006* (2013.01); *B64C 29/0033* (2013.01)

(58) Field of Classification Search
CPC .................................. E05B 5/003; E05B 5/006
See application file for complete search history.

(56) References Cited

U.S. PATENT DOCUMENTS

| | | | | |
|---|---|---|---|---|
| 1,495,752 A * | 5/1924 | La Rue | ............... | A45C 13/22 190/115 |
| 1,772,559 A * | 8/1930 | Soss | .................. | E05D 3/14 16/379 |
| 2,143,127 A * | 1/1939 | Leonard | ............. | E05B 5/003 292/DIG. 31 |
| 2,218,960 A * | 10/1940 | Rightmyer | .......... | E05B 5/003 292/DIG. 31 |
| 3,067,736 A * | 12/1962 | Barefoot | ............ | F24C 15/023 126/194 |
| 3,082,473 A * | 3/1963 | West | ................ | A45C 13/26 16/445 |
| 3,089,329 A * | 5/1963 | Kerr | ................. | E05B 5/003 70/135 |
| 3,095,727 A * | 7/1963 | Kerr | ................. | E05B 5/003 70/451 |
| 3,111,833 A * | 11/1963 | Dettmer | ............ | E05B 5/003 292/242 |
| 3,484,894 A * | 12/1969 | Fletcher | ............. | A47B 95/02 16/422 |

(Continued)

*Primary Examiner* — Jason W San
(74) *Attorney, Agent, or Firm* — Akona IP PC

(57) ABSTRACT

A handle assembly for an access panel is described and includes a support structure attached to the access panel; a handle engaging with the support structure, the handle comprising a grip portion and upper and lower flanges extending perpendicularly from the grip portion; and a retention/extension mechanism for retaining the handle in a first position and for transitioning the handle to a second position after pressure is applied to and subsequently released from the handle.

12 Claims, 8 Drawing Sheets

(56) References Cited

U.S. PATENT DOCUMENTS

| | | | | | |
|---|---|---|---|---|---|
| 4,788,746 | A | * | 12/1988 | Idler | B64G 1/222 |
| | | | | | 16/297 |
| 5,647,095 | A | * | 7/1997 | Takimoto | A45C 13/26 |
| | | | | | 16/405 |
| 5,887,927 | A | * | 3/1999 | Kurek, III | H05K 5/023 |
| | | | | | 16/415 |
| 6,581,245 | B2 | * | 6/2003 | Jen | E05B 1/0015 |
| | | | | | 16/334 |
| 6,647,593 | B2 | * | 11/2003 | Iguchi | G04B 37/1486 |
| | | | | | 74/56 |
| 6,789,294 | B2 | * | 9/2004 | Panek | E05B 1/0015 |
| | | | | | 16/409 |
| 7,712,627 | B2 | * | 5/2010 | Yang | G11B 33/022 |
| | | | | | 16/361 |
| 9,982,470 | B2 | * | 5/2018 | Jaranson | E05F 1/1215 |
| 10,087,664 | B2 | * | 10/2018 | Auriac | B64D 29/08 |
| 11,072,952 | B2 | * | 7/2021 | Elkasevic | E05D 11/06 |
| 11,519,196 | B2 | * | 12/2022 | Amante | E05B 7/00 |
| 11,719,018 | B2 | * | 8/2023 | Amante | E05B 1/0015 |
| | | | | | 49/460 |
| 2003/0121299 | A1 | * | 7/2003 | Graham | H04L 67/306 |
| | | | | | 70/208 |
| 2008/0251305 | A1 | * | 10/2008 | Shin | E05B 5/003 |
| | | | | | 180/69.21 |
| 2012/0140388 | A1 | * | 6/2012 | Ahn | E05F 1/12 |
| | | | | | 361/679.01 |
| 2012/0291359 | A1 | * | 11/2012 | Hans | E05B 5/003 |
| | | | | | 49/404 |
| 2013/0047380 | A1 | * | 2/2013 | Huang | H05K 5/023 |
| | | | | | 16/429 |
| 2014/0007381 | A1 | * | 1/2014 | Huang | A47B 95/02 |
| | | | | | 16/421 |
| 2017/0283030 | A1 | * | 10/2017 | Terry | B64C 1/1423 |
| 2019/0024413 | A1 | * | 1/2019 | Xu | E05B 3/00 |
| 2020/0181940 | A1 | * | 6/2020 | Fujiwara | E05B 7/00 |
| 2020/0199920 | A1 | * | 6/2020 | Savidge | E05B 85/107 |
| 2021/0363780 | A1 | * | 11/2021 | Amante | E05B 1/0015 |
| 2021/0363781 | A1 | * | 11/2021 | Amante | E05B 1/0015 |
| 2022/0170292 | A1 | * | 6/2022 | Dulmes | A47K 3/34 |
| 2022/0372787 | A1 | * | 11/2022 | Lorusso | E05B 5/003 |

* cited by examiner

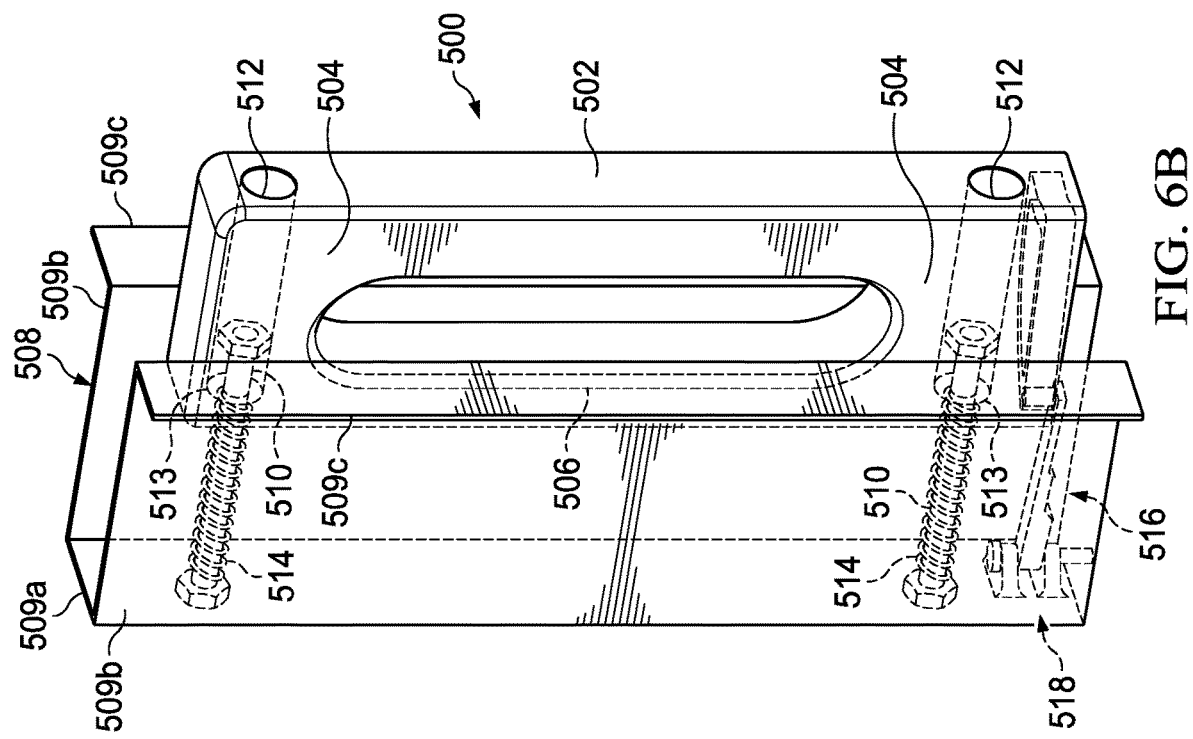
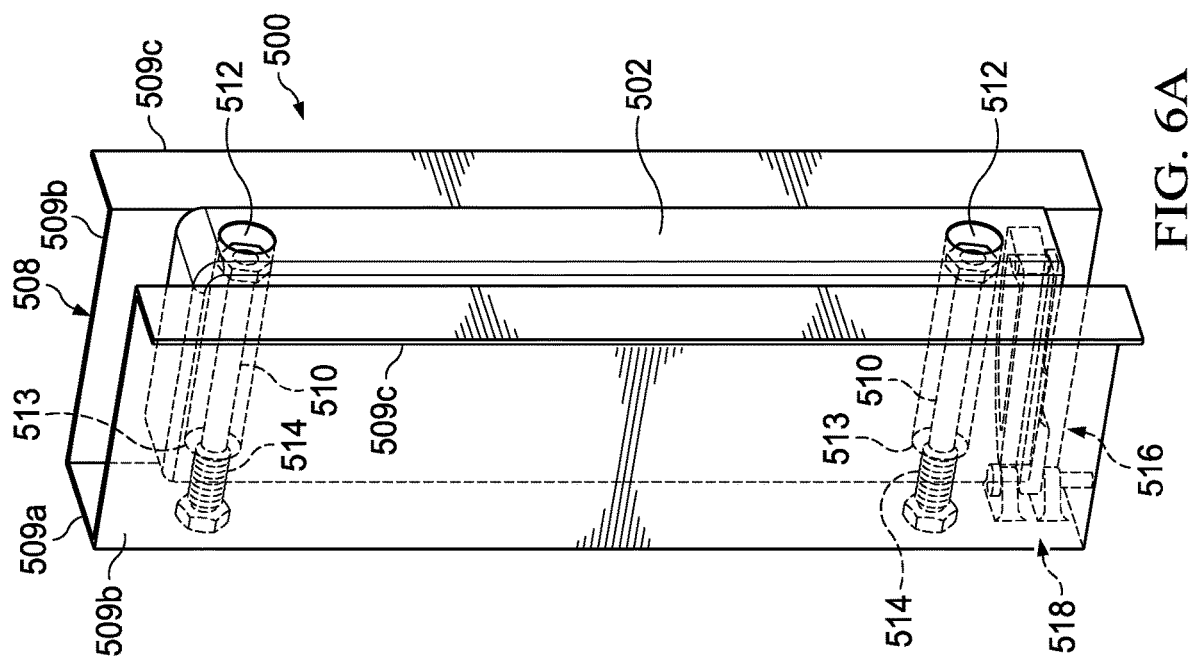

US 11,976,496 B2

TWO POSITION DOOR HANDLE WITH PUSH-PUSH MECHANISM

FOREIGN APPLICATION CLAIM OF PRIORITY

This application claims the benefit of priority under 35 U.S.C. 119(b) to Indian National Phase Patent Application Serial No. 202021021433 entitled, "TWO POSITION DOOR HANDLE WITH PUSH-PUSH MECHANISM," filed on 21 May 2020. The disclosure of this prior application is considered part of (and is incorporated by reference in) the disclosure of this application.

TECHNICAL FIELD

This disclosure relates in general to the field of aircraft and, more particularly, though not exclusively, to a two position door handle with push-push mechanism for such aircraft.

BACKGROUND

Aircraft typically have provided on exterior surfaces thereof doors or access panels for enabling access to an aircraft interior. Such doors or panels are often exceptionally large and therefore benefit from having handles disposed thereon to facilitate removal of the door/panel from and installation of the door/panel on the aircraft; however, handles extending from an exterior surface of an aircraft result in added aerodynamic drag during flight.

SUMMARY

One embodiment is a handle assembly for an access panel including a support structure attached to the access panel; a handle engaging with the support structure, the handle comprising a grip portion and upper and lower flanges extending perpendicularly from the grip portion; and a retention/extension mechanism for retaining the handle in a first position and for transitioning the handle to a second position after pressure is applied to and subsequently released from the handle.

Another embodiment is an access panel including at least one handle assembly connected to the access panel, the at least one handle assembly comprising a support structure integrated into to the access panel, the support structure comprising a C-channel; a handle engaged with the support structure, the handle comprising a grip portion and upper and lower flanges extending perpendicularly from the grip portion; and a retention/extension mechanism for selectively transitioning the handle between open and closed positions responsive to pressure applied to and subsequently released from the handle and for maintaining the handle in a current position absent pressure applied to the handle in a direction normal to a plane of the access panel.

Yet another embodiment is an aircraft including an access panel; a support structure integrated into the access panel; and a handle engaging with the support structure, the handle comprising a grip portion and upper and lower flanges extending perpendicularly from the grip portion; and a retention/extension mechanism for retaining the handle in a first position and for transitioning the handle to a second position after pressure is applied to and subsequently released from the handle.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements:

FIGS. 6A and 6B illustrate the two position door handle with push-push mechanism of FIG. 5 in closed and open positions, respectively.

DETAILED DESCRIPTION

Figure 1:
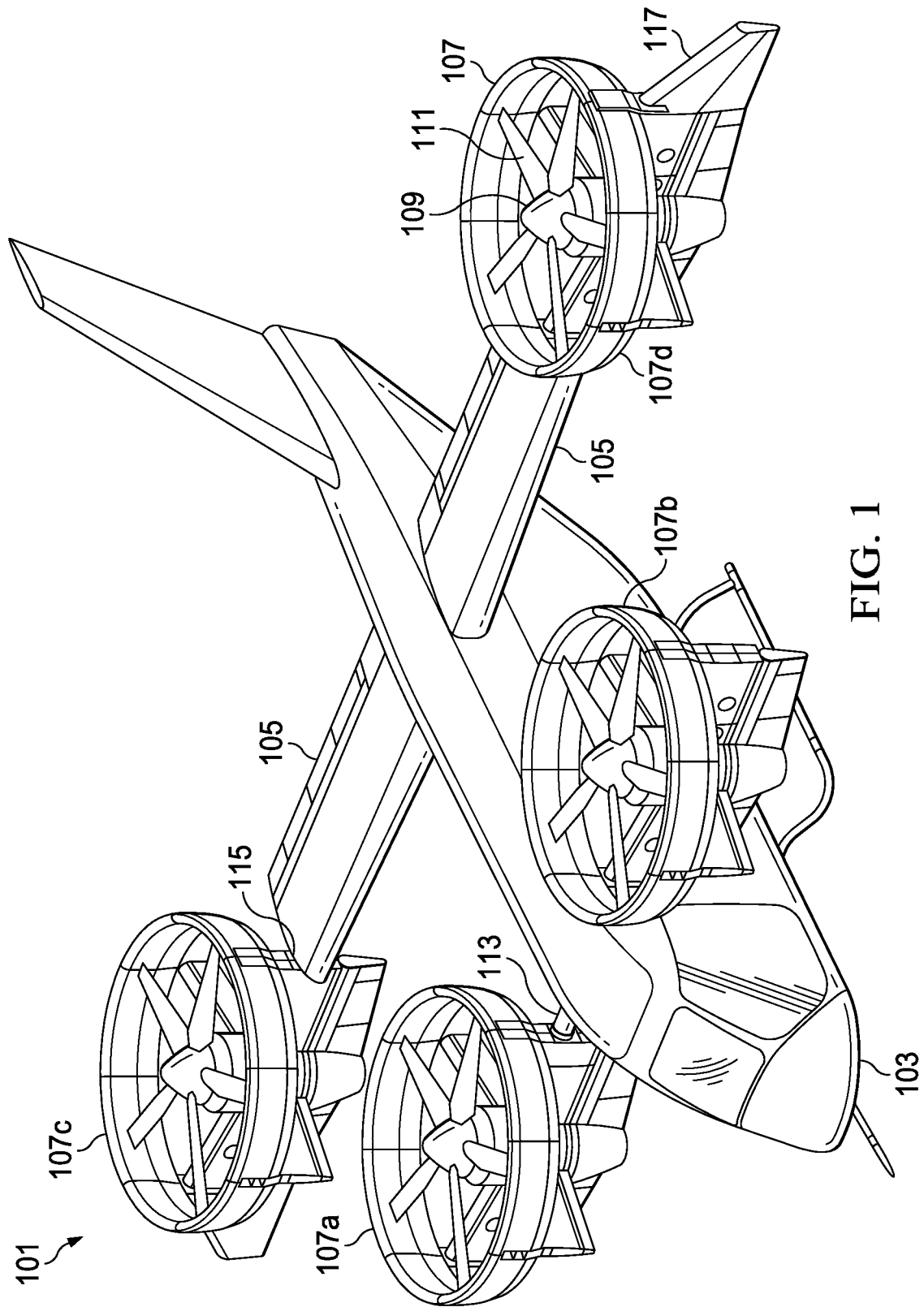
FIGS. 1 and 2 illustrate an example tiltrotor aircraft in which a two position door handle with push-push mechanism in accordance with embodiments described herein may be implemented and showing the aircraft configured to operate in a helicopter mode and an airplane mode, respectively.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Described herein is a two position door handle with push-push mechanism connected to a door or access panel (hereinafter collectively referred to as a "door") of an aircraft, for example. In accordance with features of embodiments described herein, the two position door handle with push-push mechanism is selectively recessed and stowed inside the door structure and is spring-loaded to maintain the handle in one of two positions, including an open position and a closed position. In particular embodiments, the handle is merely pushed to move it between open and closed positions using a unique guide path. The two position door handle with push-push mechanism described herein reduces aerodynamic drag and improves aesthetics by not projecting out of fuselage. The handle design is scalable, modular, and may be used for hold requirements not limited to the door.

Figure 2:
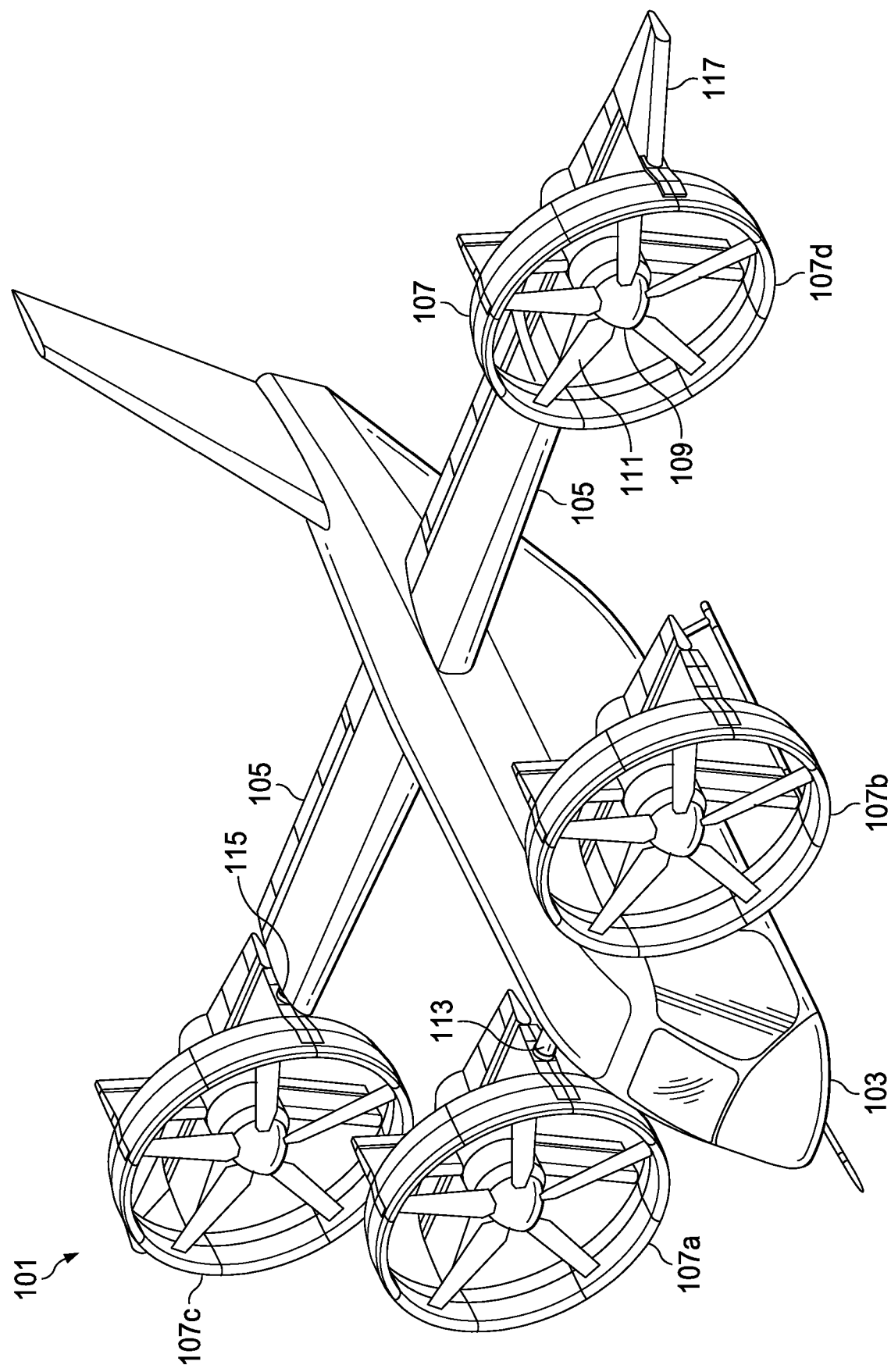

FIGS. 1 and 2 illustrate an example tiltrotor aircraft 101 that includes ducted rotors (or fans). The tiltrotor aircraft 101 is convertible between a helicopter mode (shown in FIG. 1), which allows for vertical takeoff and landing, hovering, and low speed directional movement, and an airplane mode (shown in FIG. 2), which allows for forward flight as well as horizontal takeoff and landing.

Aircraft 101 comprises a fuselage 103 with a fixed wing 105 that extends therefrom and a plurality of rotatable ducts 107. Each duct 107 houses a power plant for driving an attached rotor 109 in rotation. Each rotor 109 has a plurality of blades 111 configured to rotate within ducts 107.

In the illustrated embodiment, aircraft 101 is configured with four ducts 107, including two ducts 107a and 107b that form a forward pair of ducts and two ducts 107c and 107d that form an aft pair of ducts. Each duct 107 is rotatably coupled to fuselage 103 of aircraft 101 via a spindle. Ducts 107a and 107b are coupled directly to fuselage 103 by a respective spindle 113. Ducts 107c and 107d are each independently coupled to a corresponding end of wing 105 via a respective spindle 115. As shown, each of ducts 107c and 107d includes a winglet 117 that is coupled thereto. It should be appreciated that aircraft 101 is not limited to the illustrated configuration having four ducts 107, and that aircraft 101 may alternatively be implemented with more or fewer ducts 107.

The position of ducts 107, and optionally the pitch of blades 111, can be selectively controlled to control direction, thrust, and lift of rotors 109. For example, ducts 107 are repositionable to convert aircraft 101 between a helicopter mode and an airplane mode. As shown in FIG. 1, ducts 107 are positioned such that aircraft 101 is in helicopter mode, which allows for vertical takeoff and landing, hovering, and low-speed directional movement. As shown in FIG. 2, ducts 107 are positioned such that aircraft 101 is in airplane mode, which allows for high-speed forward-flight. In particular, in airplane mode, ducts 107 direct their respective thrusts in the aft direction to propel aircraft 101. Aircraft 101 is operable to fly in all directions during the vertical takeoff and landing (i.e., helicopter) mode configuration of FIG. 1, although faster forward flight is achievable while in the forward flight (i.e., airplane) mode configuration of FIG. 2. Ducted fans 107 may be tiltable between the vertical and horizontal positions by spindles 113, 115, which are rotatable in response to commands originating from a pilot and/or a flight control system of the aircraft 101.

Figure 3:
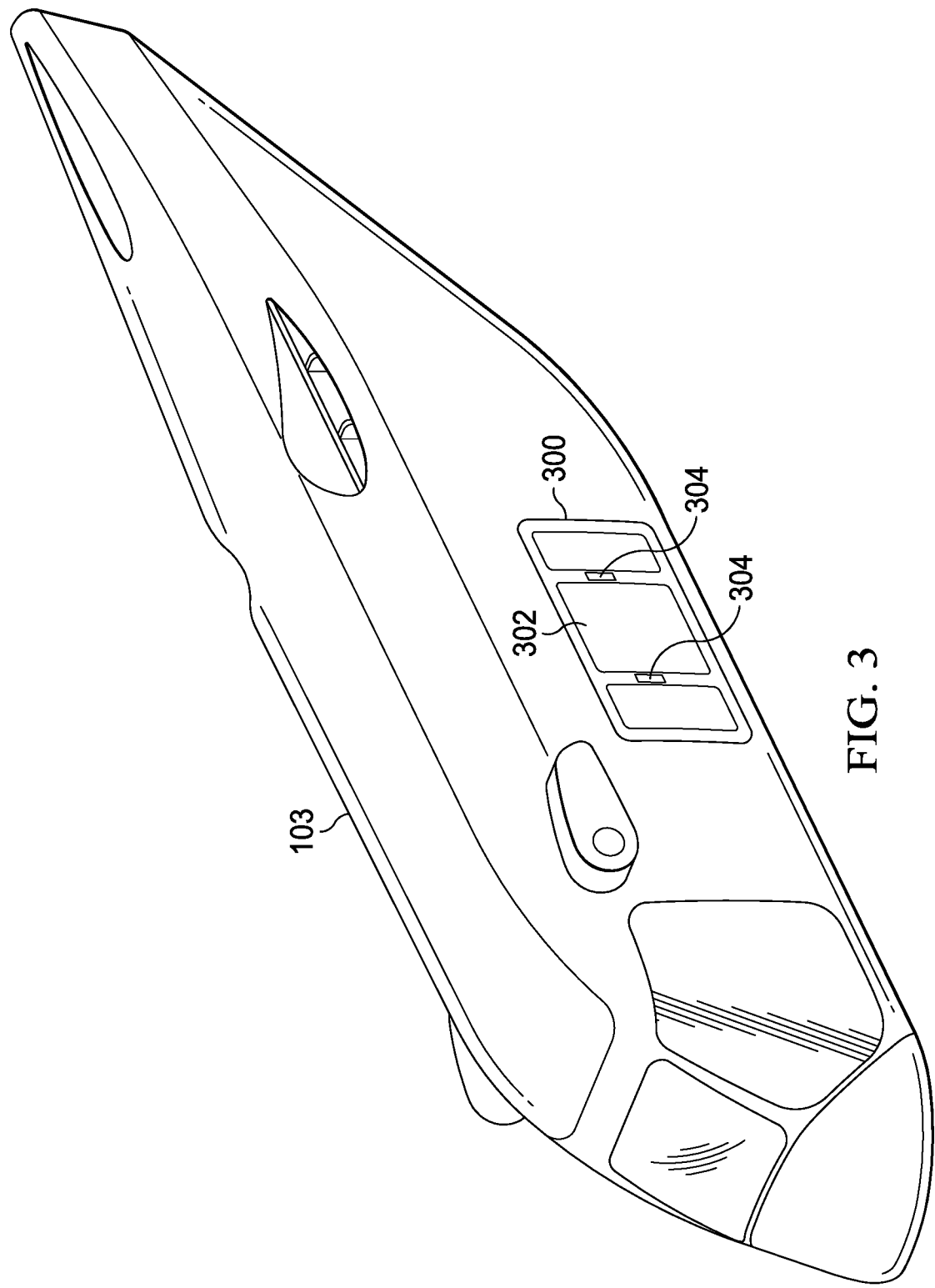
FIG. 3 is an illustration of the tiltrotor aircraft of FIGS. 1 and 2 with the wing and rotors removed to facilitate illustration and explanation of the two position door handle with push-push mechanism in accordance with embodiments described herein.

FIG. 3 illustrates the fuselage 103 of the aircraft 101 so that a door, or access panel, 300 is more clearly visible. In certain embodiments, door 300 covers an opening in skin 302 of the fuselage 103; therefore, removing the door 300 provides access to the opening and thus into the fuselage. It will be recognized that, although not shown in FIG. 3, aircraft 101 may be provided with additional doors for accessing areas of the aircraft internal to the fuselage 103, for example. As shown in FIG. 3, door 300 is provided with two position door handles with push-push mechanisms 304 embodying features that will be described in greater detail hereinbelow.

Figure 4:
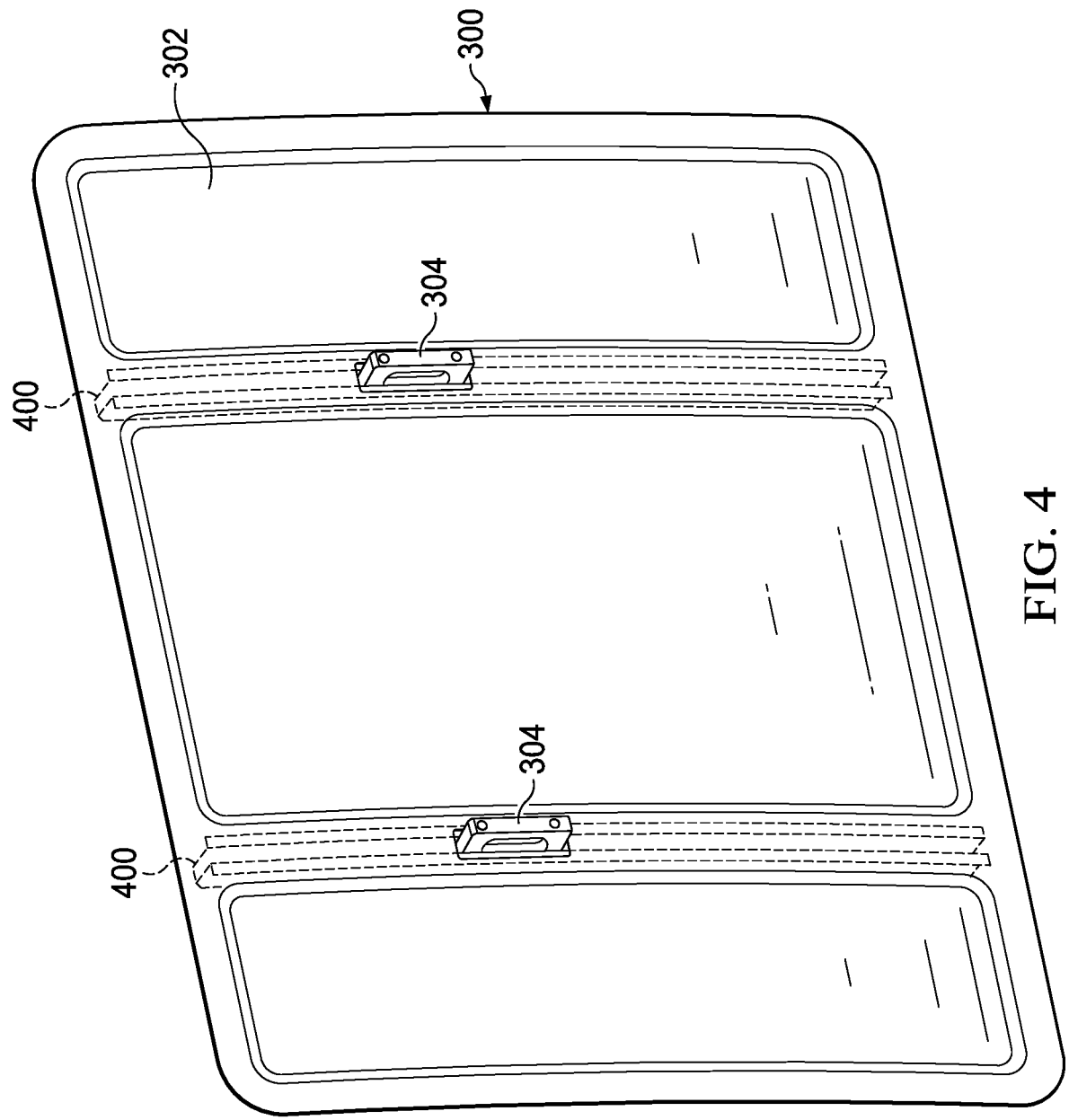
FIG. 4 illustrates a door panel for a tiltrotor aircraft to which a pair of two position door handles with push-push mechanisms in accordance with embodiments described herein are connected.

FIG. 4 is a more detailed view of the door 300 with the handles 304 attached. In one embodiment, as shown in FIG. 4, door 300 includes channels 400 (in particular, C-channels) in which handles 304 may be attached and/or secured, as will be described in greater detail below.

It will be recognized that, while handles 304 are useful and/or necessary for removing the door 300 from the fuselage 103 and returning the door to the fuselage, during flight of the aircraft 101, the handles result in increased aerodynamic drag. Therefore, the fact that handles 304 may be selectively extended from the door 302 (or opened) when needed and easily retracted or stowed in the door 300 (or closed) when not in use and/or when the aircraft 101 is in flight is highly beneficial.

Figure 5:
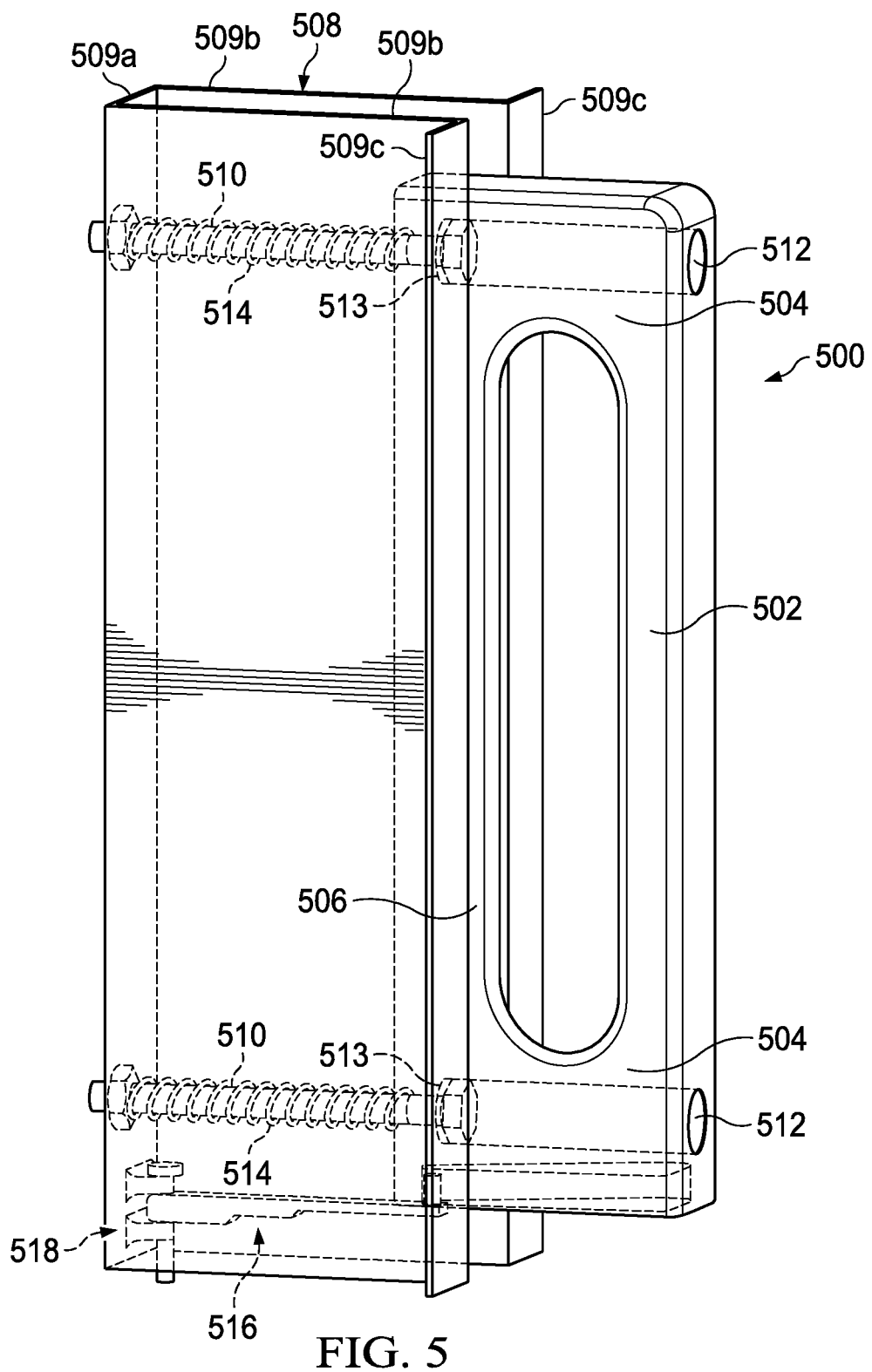
FIG. 5 illustrates a more detailed view of a two position door handle with push-push mechanism in accordance with embodiments described herein.

FIG. 5 is a more detailed view of a two position door handle with push-push mechanism 500 (which may be used to implement handles 304) connected to a door (not shown in FIG. 5 but which may correspond to door 300) in accordance with features of embodiments described herein. As shown in FIG. 5, the handle 500 is in an extended position. Door handle 500 comprises an elongated grip portion 502 that may be grasped by a user during removal and/or installation of a door to which the handle is attached. Flanges 504 are disposed on opposite ends of grip portion 502 and extend substantially perpendicular to and form approximately 90 degree angles with the grip portion 502. Handle 500 may optionally include an interior member 506 disposed between interior ends of flanges 504.

A handle support 508 may be provided and may be implemented as a C-channel comprising a web 509A, flanges 509B, and lips 509C. The dimensions (e.g., depth of the flanges 509B and width of the web 509A) of the support 508 are sufficient to accommodate corresponding dimensions of the handle 500 such that when the handle 500 is in a closed position, a front face of the grip portion 502 lies substantially flush with or slightly recessed from the front surfaces of the lips 509C of the support 508. In some embodiments, support 508 may replace a channel provided in the door (such as channels 400 (FIG. 4)). In other embodiments, support 508 is disposed within a channel provided in the door (such as channels 400 (FIG. 4)). In still other embodiments, support 508 may be integral with/comprise a portion of a channel provided in the door (such as channels 400 (FIG. 4)). All or part of a channel that does not coincide with support 508 may be covered by the skin of the door.

In accordance with features of embodiments described herein, guide bolts 510 are provided and each include a first end connected through the web 509A of the support 508 with a threaded nut 511 that engages the first ends of the guide bolt on the back surface of the web 509A of the support 508, for example. Second ends of each of the guide bolts 510 opposite the first ends thereof extend into openings (e.g., tunnels) 512 provided through flanges 504. Counterbores 513 terminate tunnels 512 interior to flanges 504 to enable heads of guide bolts 510 to act as stoppers for the handle open position. In particular, when handle 500 is open, heads of guide bolts 510 rest within respective counterbores 513, thereby preventing further movement of the handle outward from the support 508. Compression springs 514 are provided for biasing handle 500 in an extended (open) position for purposes described hereinbelow. In particular embodiments, compression springs 514 are made of zinc-plated music wire steel and have a maximum load of 2.5 pounds and a rating of 1.4 pounds per inch, although it will be recognized that compression springs having different characteristics may be advantageously employed depending on the particular application. An extension/retention mechanism 516 comprising a cam and follower mechanism, as will be described, is provided in connection with and proximate one or both of the guide bolts 510 and disposed within one or both flanges 504. As shown in the figures provided herein, extension/retention mechanism 516 is disposed solely in the lower flange 504. In the illustrated embodiment, extension/retention mechanism 516 includes a clevis assembly 518 for securing a portion of extension/retention mechanism to support 508, as further described hereinbelow. Clevis assembly 510 may be integrated with or otherwise attached to support 508.

FIG. 6A illustrates handle 500 in a closed (retracted) position. FIG. 6B illustrates handle 500 in an open (extended) position. Transitioning of the handle 500 between open and closed positions as enabled by the extension/retention mechanism 516 will be described in greater detail with reference to FIGS. 7A and 7B.

Figure 7A:
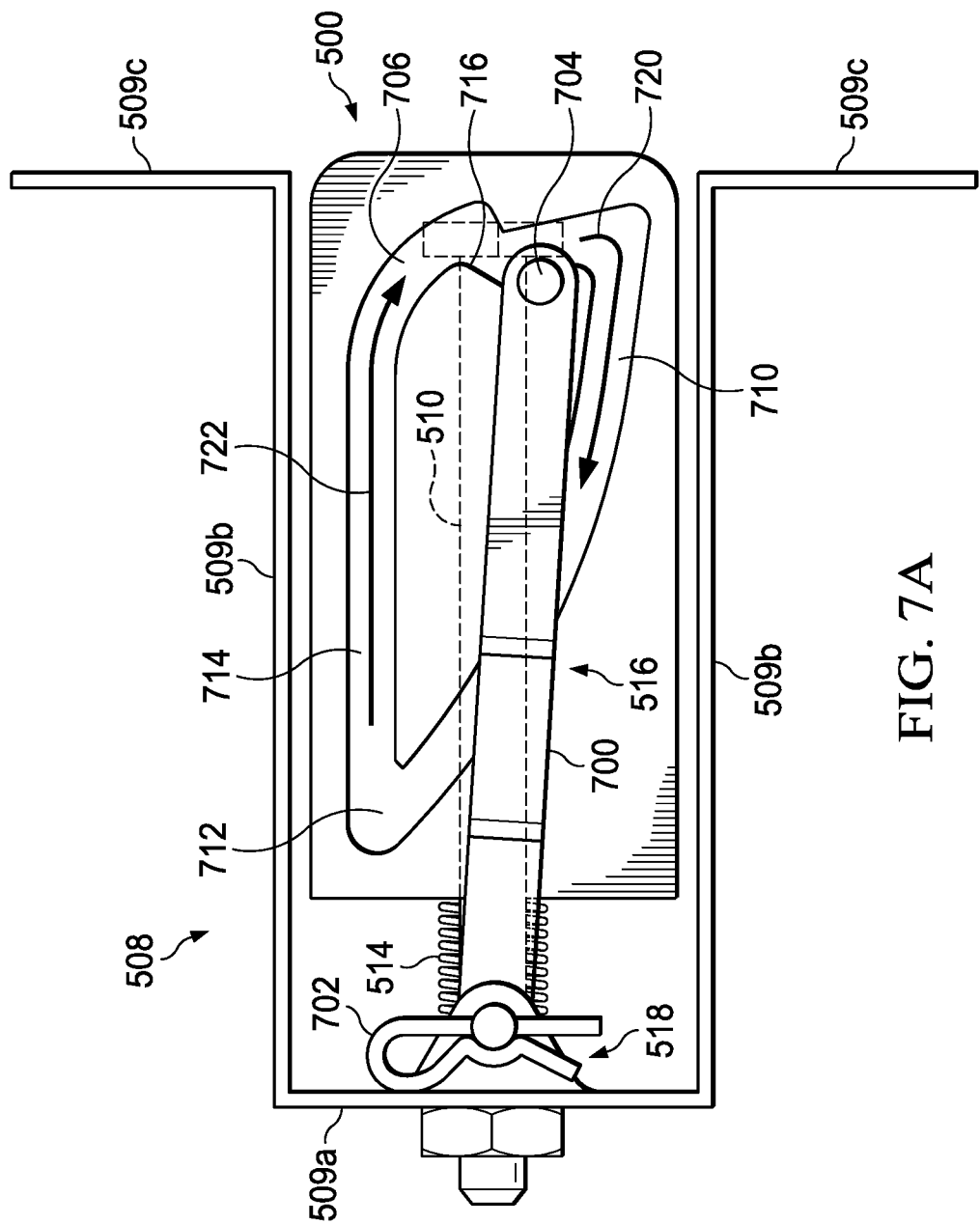
FIGS. 7A and 7B illustrate operation of an extension/retention mechanism for transitioning the two position door handle with push-push mechanism of FIG. 5 between closed and open positions.
Figure 7B:
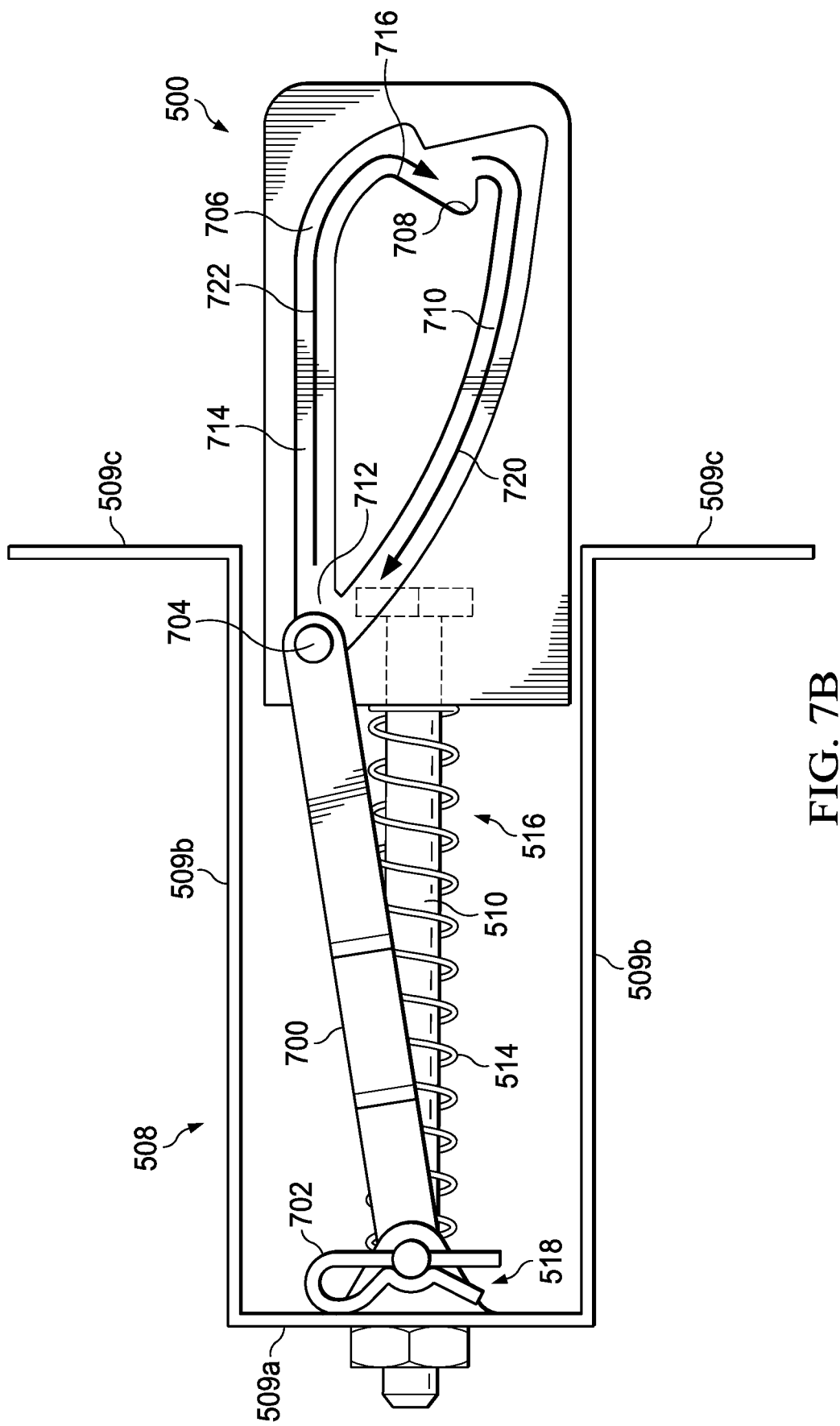

FIGS. 7A and 7B illustrate the extension/retraction mechanism 516 in greater detail, including operation thereof. In particular, FIG. 7A illustrates the state of the mechanism 516 and the compression springs 514 (represented in FIG. 7A by a single one of the compression springs) when the handle 500 is closed/retracted. FIG. 7B illustrates the state of the mechanism 516 and the compression springs 514 (represented in FIG. 7B by a single one of the compression springs) when the handle 500 is open/extended. As shown in FIGS. 7A and 7B, in addition to the guide bolt 510 and compression spring 514, the mechanism 516 includes a follower 700 hingedly connected to an interior face of the web 509A of the support 508 via a hinge pin 702 connected to clevis assembly 518 at a first end of the follower 700 and having a follower pin 704 disposed at an opposite end of the follower 700. An irregularly shaped guide path 706 functions as a cam and is provided within the flange 504 and is engaged by and retains the follower pin 704 as will be described.

When the handle 500 is in the closed position (FIG. 7A), the follower pin 704 is retained in a notch 708 (FIG. 7B) disposed in guide path 706 due to the bias of the compressed compression spring 514 against the inboard side of the flange 504. In operation, to move the handle 500 from the closed position (FIG. 7A) to the open position (FIG. 7B), the handle 500 (e.g., the grip portion 502) is pressed in a direction normal to a plane of the access panel, which releases the follower pin 704 from the notch 708, allowing the pin to drop to a first portion 710 of the guide path 706. At that point, when the pressure that was applied to the handle 500 is released, the compression spring 514 decompresses, biasing the handle 500 toward the open position (FIG. 7B), guided by the guide bolt 510 passing through the opening 512, and the follower pin moves along the first portion 710 of the guide path 706 until it engages at a transition point 712 disposed between the first portion 710 of the guide path 706 and a second portion 714 of the guide path 706. At this point, the handle 500 is in the open position shown in FIG. 7B. The force exerted by the extended compression spring 514 against the inboard side of the flange 504 maintains the handle in the open position during use.

To move the handle 500 from the open position (FIG. 7B) to the closed position (FIG. 7A), pressure sufficient to overcome the biasing force of the compression spring 514 is applied to the handle 500 (e.g., the grip portion 502) in a direction normal to the plane of the access panel, which compresses the compression spring 514 and causes the follower pin 704 to move from the transition point 712 along the first portion 714 of the guide path 706. Once the follower pin 704 passes a second transition point 716, the shape of the guide path 706 returns the follower pin 704 to the notch 708, such that the handle 500 is retained in the closed position (FIG. 7A). As best shown in FIG. 7B, the path of the follower pin 704 along the guide path 706 in a clockwise direction, as represented by arrows 720 (which represents the path of the follower pin 704 along the first portion 710 of the guide path 706) and 722 (which represents the path of the follower pin 704 along the second portion 714 of the guide path 706).

It should be appreciated that aircraft illustrated herein, such as aircraft 101, is merely illustrative of a variety of aircraft that can implement the embodiments disclosed herein. Indeed, the various embodiments described herein may be used on any aircraft that utilizes motors. Other aircraft implementations can include hybrid aircraft, tiltrotor aircraft, quad tiltrotor aircraft, unmanned aircraft, gyrocopters, airplanes, helicopters, commuter aircraft, electric aircraft, hybrid-electric aircraft, ducted fan aircraft having any number of ducted fans, tiltwing aircraft, including tiltwing aircraft having one or more interwing linkages, more or fewer ducted fans or non-ducted rotors and the like. As such, those skilled in the art will recognize that the embodiments described herein can be integrated into a variety of aircraft configurations. It should be appreciated that even though aircraft are particularly well-suited to implement the embodiments of the present disclosure, non-aircraft vehicles and devices can also implement the embodiments.

Example 1 is a handle assembly for an access panel including a support structure attached to the access panel; a handle engaging with the support structure, the handle comprising a grip portion and upper and lower flanges extending perpendicularly from the grip portion; and a retention/extension mechanism for retaining the handle in a first position and for transitioning the handle to a second position after pressure is applied to and subsequently released from the handle.

In Example 2, the handle assembly of Example 1 may further include the first position being a closed position in which a front face of the grip portion is substantially parallel with a front face of the access panel and the second position being an open position in which the handle is extended from the front face of the access panel such that the grip portion is accessible to be grasped by a user's hand.

In Example 3, the handle assembly of Example 1 may further include the first position being an open position in which the handle is extended from the front face of the access panel such that the grip portion is accessible to be grasped by a user's hand and the second position being a closed position in which a front face of the grip portion is substantially parallel with a front face of the access panel.

In Example 4, the handle assembly of any of Examples 1-3 may further include the extension/retention mechanism being associated with at least one of the upper and lower flanges.

In Example 5, the handle assembly of any of Examples 1-4 may further include the extension/retention mechanism being associated with the lower flange.

In Example 6, the handle assembly of any of Examples 1-5 may further include the upper and lower flanges including tunnels for receiving guide bolts each having a head end and a distal end and the head end of each of the guide bolts being retained within one of the tunnels and the distal end of each of the guide bolts being connected to the support structure.

In Example 7, the handle assembly of any of Examples 1-6 may further include compression springs for biasing the guide bolts to an extended position corresponding to an open position of the handle assembly.

In Example 8, the handle assembly of any of Examples 1-7 may further include the support structure comprising a C-channel.

In Example 9, the handle assembly of any of Examples 1-8 may further include holes in the support structure for receiving the distal ends of the guide bolts and nuts for securing the distal ends of the guide bolts to the support structure.

In Example 10, the handle assembly of any of Examples 1-9 may further include the extension/retention mechanism comprising a cam and follower mechanism.

Example 11 is an access panel including at least one handle assembly connected to the access panel, the at least one handle assembly comprising a support structure integrated into to the access panel, the support structure comprising a C-channel; a handle engaged with the support structure, the handle comprising a grip portion and upper and lower flanges extending perpendicularly from the grip portion; and a retention/extension mechanism for selectively transitioning the handle between open and closed positions responsive to pressure applied to and subsequently released from the handle and for maintaining the handle in a current position absent pressure applied to the handle in a direction normal to a plane of the access panel.

In Example 12, the access panel of Example 11 may further include in the open position the handle being extended from the front face of the access panel such that the grip portion is accessible to be grasped by a user's hand and in the closed position a front face of the grip portion being substantially parallel with a front face of the access panel.

In Example 13, the access panel of any of Examples 11-12 may further include the upper and lower flanges including tunnels for receiving guide bolts each having a head end and a distal end and the head end of each of the guide bolts being retained within one of the tunnels and the distal end of each of the guide bolts is connected to the support structure.

In Example 14, the access panel of any of Examples 11-13 may further include compression springs for biasing the guide bolts to an extended position corresponding to an open position of the handle assembly.

In Example 15, the access panel of any of Examples 11-14 may further include the extension/retention mechanism comprising a cam and follower mechanism.

Example 16 is an aircraft including an access panel; a support structure integrated into the access panel; and a handle engaging with the support structure, the handle comprising a grip portion and upper and lower flanges extending perpendicularly from the grip portion; and a retention/extension mechanism for retaining the handle in a first position and for transitioning the handle to a second position after pressure is applied to and subsequently released from the handle.

In Example 17, the aircraft of Example 16 may further include the first position being a closed position in which a front face of the grip portion is substantially parallel with a front face of the access panel and the second position being an open position in which the handle is extended from the front face of the access panel such that the grip portion is accessible to be grasped by a user's hand.

In Example 18, the aircraft of Example 16 may further include the first position being an open position in which the handle is extended from the front face of the access panel such that the grip portion is accessible to be grasped by a user's hand and the second position being a closed position in which a front face of the grip portion is substantially parallel with a front face of the access panel.

In Example 19, the aircraft of any of Examples 16-18 may further include the upper and lower flanges including tunnels for receiving guide bolts each having a head end and a distal end and the head end of each of the guide bolts being retained within one of the tunnels and the distal end of each of the guide bolts being connected to the support structure, and the handle assembly may further include compression springs for biasing the guide bolts to an extended position corresponding to an open position of the handle assembly.

In Example 20, the aircraft of any of Examples 16-19 may further include the extension/retention mechanism comprising a cam and follower mechanism.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R = Rl + k*(Ru-$ R1), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A handle assembly for an access panel comprising:
   a support structure attached to the access panel;
   a handle engaging with the support structure, the handle comprising:
   a grip portion; and
   upper and lower flanges extending perpendicularly from the grip portion; and
   an extension/retention mechanism comprising a cam and follower for retaining the handle in a first position and for transitioning the handle to a second position after pressure is applied to and subsequently released from the handle, wherein the cam comprises an irregularly shaped guide path provided within one of the flanges and wherein the follower comprises a follower arm comprising a first end hingedly connected to the support structure and a pin disposed at a second end opposite the first end, wherein the pin is engaged by and retained within the irregularly shaped guide path.

2. The handle assembly of claim 1, wherein the first position is a closed position in which a front face of the grip portion is substantially parallel with a front face of the access panel and the second position is an open position in which the handle is extended from the front face of the access panel such that the grip portion is accessible to be grasped by a user's hand.

3. The handle assembly of claim 1, wherein the first position is an open position in which the handle is extended from the front face of the access panel such that the grip portion is accessible to be grasped by a user's hand and the second position is a closed position in which a front face of the grip portion is substantially parallel with a front face of the access panel.

4. The handle assembly of claim 1, wherein the extension/retention mechanism is associated with at least one of the upper and lower flanges.

5. The handle assembly of claim 1, wherein the extension/retention mechanism is associated with the lower flange.

6. The handle assembly of claim 1, wherein the upper and lower flanges include tunnels for receiving guide bolts each having a head end and a distal end and wherein the head end of each of the guide bolts is retained within one of the tunnels and the distal end of each of the guide bolts is connected to the support structure.

7. The handle assembly of claim 6 further comprising compression springs for biasing the guide bolts to an extended position corresponding to an open position of the handle assembly.

8. The handle assembly of claim 6, wherein the support structure comprises a C-channel.

9. The handle assembly of claim 8 further comprising holes in the support structure for receiving the distal ends of the guide bolts and nuts for securing the distal ends of the guide bolts to the support structure.

10. The handle assembly of claim 1, wherein the pin traverses a first portion of the irregularly shaped guide path when the handle transitions from the first position to the second position.

11. The handle assembly of claim 10, wherein the pin traverses a second portion of the irregularly shaped guide path a when the handle transitions from the second position to the first position.

12. The handle assembly of claim 11, wherein the first and second portions together comprise an entirety of the irregularly shaped guide path.

* * * * *